(12) United States Patent
Kaji et al.

(10) Patent No.: US 8,904,807 B2
(45) Date of Patent: Dec. 9, 2014

(54) HEAT EXCHANGER UNIT AND THERMAL CYCLING UNIT

(75) Inventors: Shiori Kaji, Kanagawa (JP); Tadahiko Kobayashi, Kanagawa (JP); Akiko Saito, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 919 days.

(21) Appl. No.: 13/079,218

(22) Filed: Apr. 4, 2011

(65) Prior Publication Data

US 2012/0073307 A1  Mar. 29, 2012

(30) Foreign Application Priority Data

Sep. 29, 2010  (JP) ................................ 2010-219990

(51) Int. Cl.
*F25B 21/00*  (2006.01)

(52) U.S. Cl.
CPC ......... *F25B 21/00* (2013.01); *F25B 2321/0022* (2013.01); *Y02B 30/66* (2013.01)
USPC .......................................................... 62/3.1

(58) Field of Classification Search
CPC ............. F25B 21/00; F25B 2321/0021; F25B 2321/0023
USPC ............................................................. 62/3.1
See application file for complete search history.

(56) References Cited

U.S. PATENT DOCUMENTS

| 4,332,135 | A | 6/1982 | Barclay et al. |
| 4,642,994 | A | 2/1987 | Barclay et al. |
| 4,970,866 | A | 11/1990 | Mokadam |
| 2003/0005706 | A1 | 1/2003 | Bell |
| 2004/0182086 | A1 | 9/2004 | Chiang et al. |
| 2007/0240428 | A1 | 10/2007 | Koga et al. |
| 2008/0078184 | A1 | 4/2008 | Saito et al. |
| 2009/0113897 | A1* | 5/2009 | Dinesen et al. ................. 62/3.1 |
| 2009/0320499 | A1 | 12/2009 | Muller et al. |
| 2011/0173993 | A1* | 7/2011 | Muller et al. ..................... 62/3.1 |
| 2011/0289937 | A1 | 12/2011 | Muller et al. |

FOREIGN PATENT DOCUMENTS

| EP | 0 084 929 | 8/1983 | |
| FR | 2 942 305 | 8/2010 | |
| JP | 2006-308197 | 11/2006 | |
| JP | 2007-147136 | 6/2007 | |
| JP | 2007-271138 | 10/2007 | |
| JP | 2009-544927 | 12/2009 | |
| WO | WO2010/034907 | * 4/2010 | ............. H01L 37/04 |

OTHER PUBLICATIONS

Notification of Reason(s) for Refusal Issued by the Japanese Patent Office on Aug. 22, 2012, for Japanese Patent Application No. 2010-219990, and English-language translation thereof.
Notification of Reason(s) for Refusal issued by the Japanese Patent Office on Apr. 2, 2013, for Japanese Patent Application No. 2010-219990, and English-language translation thereof.
Extended European Search Report issued by the European Patent Office on Apr. 24, 2013, for European Patent Application No. 11160960.8.

* cited by examiner

*Primary Examiner* — Cassey D Bauer
(74) *Attorney, Agent, or Firm* — Finnegan, Henderson, Farabow, Garrett & Dunner, L.L.P.

(57) ABSTRACT

A heat exchanger unit according to an exemplary embodiment includes: a plurality of heat exchangers that includes magnetic particles therein; and a connection section that is provided between the heat exchangers to connect the heat exchangers, the connection section including a solid-core member, a porous body or a combined substance of the solid-core member and the porous body. In the heat exchanger unit, the connection section invades partially into an inside of the heat exchanger connected thereto.

17 Claims, 8 Drawing Sheets

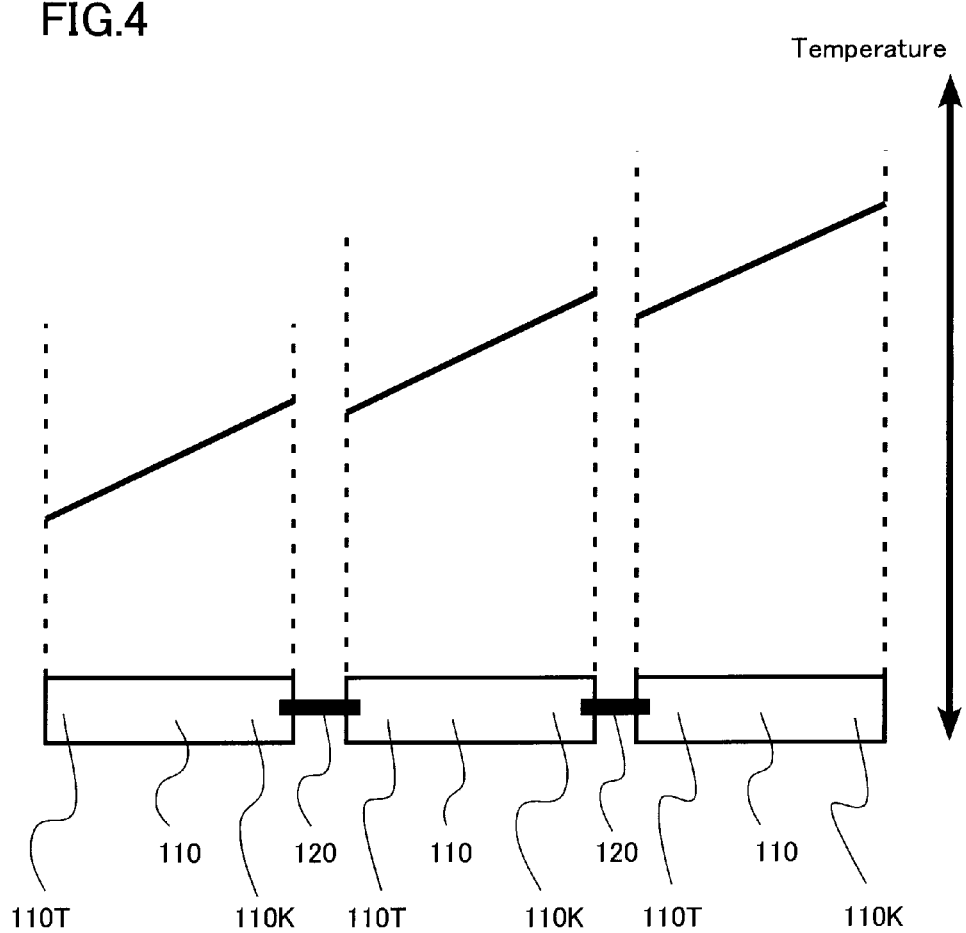

HEAT EXCHANGER UNIT AND THERMAL CYCLING UNIT

CROSS-REFERENCE TO RELATED APPLICATION

This application is based upon and claims the benefit of priority from Japanese Patent Application No. 2010-219990, filed on Sep. 29, 2010, the entire contents of which are incorporated herein by reference.

FIELD

Embodiments described herein relate generally to a heat exchanger unit and a thermal cycling unit.

BACKGROUND

Currently, a gas compression and expansion cycle is used in almost all the cold and heat generating technologies, such as a refrigerator, a freezer and an air conditioner, in a room temperature range that relates closely to the daily life of a human. However, as to the cold heat technologies based on the gas compression and expansion cycle, an environmental destruction caused by emission of a specific chlorofluorocarbon gas into air becomes a big problem, and there is a fear that an alternative for chlorofluorocarbon might also affect the environment. Therefore, a natural refrigerant (such as $CO_2$ and ammonia) or isobutane, which have low environmental risks, are proposed, and there is a demand for practical application of a safety, high-efficiency thermal cycling unit having no environmental destruction caused by the disposal of the refrigerant gas.

Expectations of magnetic refrigeration are enhanced as one of environment-friendliness, high-efficiency refrigeration techniques, and research and development of the magnetic refrigeration technique aimed at a room temperature region are increasingly performed. The magnetic refrigeration technique is based on a magnetocaloric effect. The magnetocaloric effect is a phenomenon in which a temperature of a magnetic material changes when an externally applied magnetic field is changed with respect to the magnetic material in an adiabatic state.

The magnetocaloric effect is maximized near a magnetic transition temperature, and the magnetocaloric effect decreases with departing from the magnetic transition temperature. Considering the above tendency of the magnetocaloric effect, to widen the operating temperature of the whole thermal cycling unit that obtains the high heat or cold heat from the heat exchanger unit, heat exchangers filled with the magnetic materials having different magnetic transition temperatures may be coupled to form a heat exchanger unit.

On the other hand, when the many heat exchangers filled with the magnetic materials are coupled and a liquid refrigerant flow thorough the heat exchangers, a pressure loss may increases to hardly control a flow of the liquid refrigerant. When the flow of the liquid refrigerant is interrupted, accumulation of the heat is occurred and therefore the efficiency of the system is lowered.

BRIEF DESCRIPTION OF THE DRAWINGS

FIG. 4 is a view illustrating a temperature gradient of a heat exchanger of the first embodiment.

DETAILED DESCRIPTION

A heat exchanger unit according to an exemplary embodiment includes: a plurality of heat exchangers each of which includes magnetic particles therein; and a connection section that is provided between the heat exchangers to connect the heat exchangers, the connection section including a solid-core member, a porous body or a combined substance of the solid-core member and the porous body. In the heat exchanger unit, the connection section invades partially into an inside of the heat exchanger connected thereto.

First Embodiment

Figure 1:
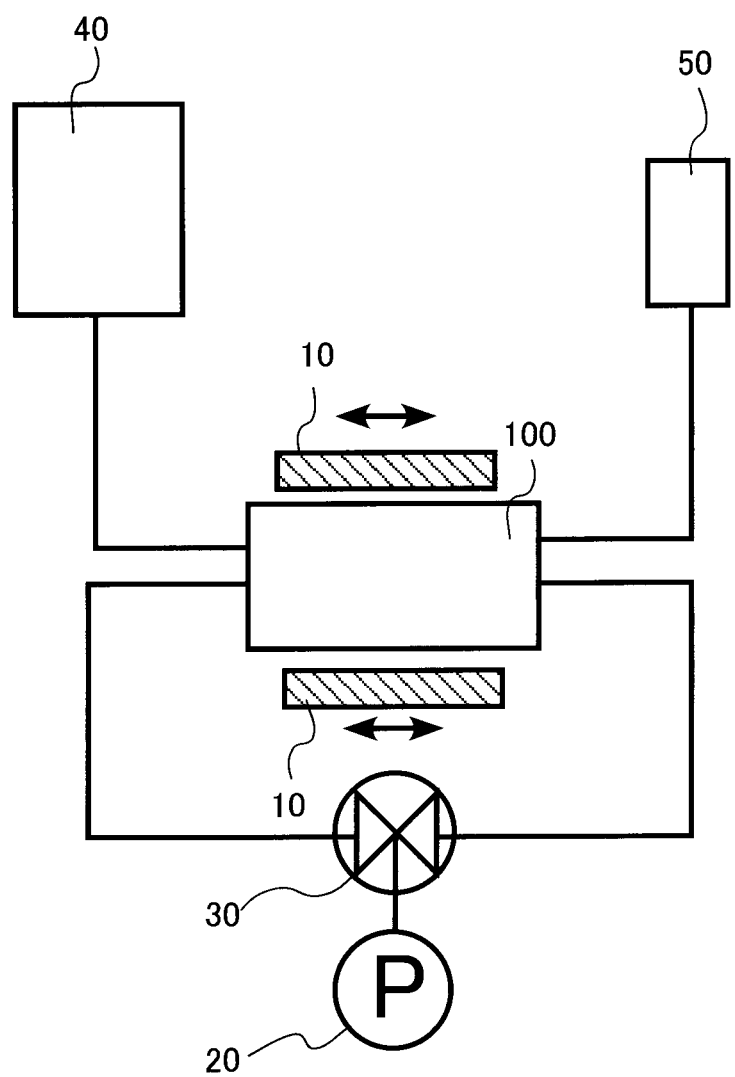
FIG. 1 is a view illustrating a thermal cycling unit according to a first embodiment.

A first embodiment will be described with reference to FIG. 1 and FIG. 2. FIG. 1 is a sectional view illustrating a thermal cycling unit according to a first embodiment. The thermal cycling unit includes a heat exchanger unit 100, permanent magnets 10 that are provided across the heat exchanger unit 100 from each other, a driving device (not illustrated) that drives the permanent magnets 10, a low-temperature-side heat exchanger 40 that is connected to the heat exchanger unit 100, and a high-temperature-side heat exchanger 50 that is connected to the heat exchanger unit 100. Magnetic particles having magnetocaloric effects are provided in the heat exchanger unit 100.

The thermal cycling unit also includes a refrigerant pump 20 that causes a liquid refrigerant to flow into the heat exchanger unit 100 and a switching section 30 for switching a flowing direction of the liquid refrigerant. The switching section 30 is connected to both ends of the heat exchanger unit 100, and the refrigerant pump 20 is connected to the switching section 30. The liquid refrigerant flows from the side of the low-temperature-side heat exchanger 40 to the side of the high-temperature-side heat exchanger 50 in the heat exchanger unit 100, or flows in the reverse direction. The high-temperature-side heat exchanger 50 is connected to the heat exchanger unit 100 and emits thermal energy of the heat exchanger unit 100. The low-temperature-side heat exchanger 40 is connected to the heat exchanger unit 100 and supplied the thermal energy from the heat exchanger unit 100. The low-temperature-side heat exchanging 40 receives cold energy of the heat exchanger unit 100.

Figure 2:
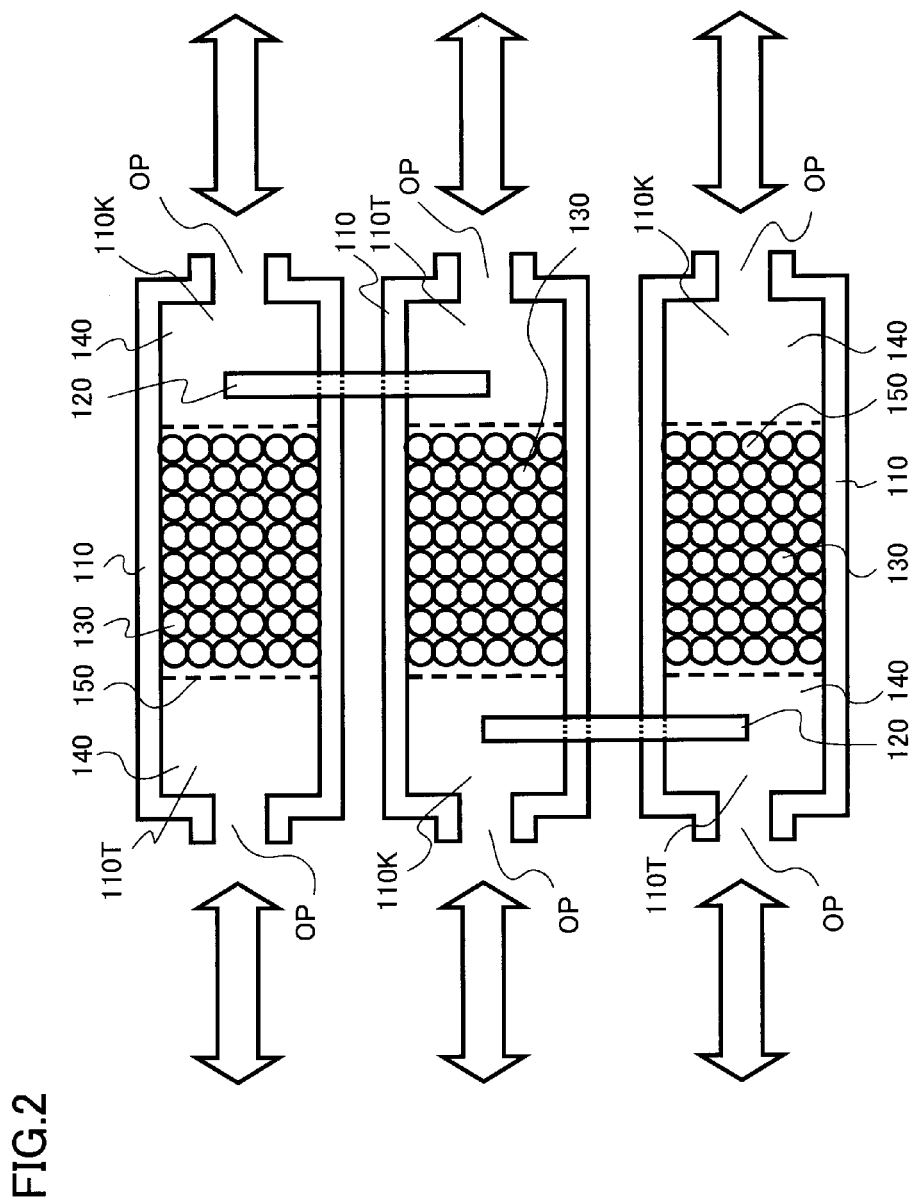
FIG. 2 is an enlarged sectional view illustrating a heat exchanger unit of the first embodiment.

FIG. 2 is an enlarged sectional view illustrating the heat exchanger unit 100 of the thermal cycling unit of FIG. 1. The heat exchanger unit 100 includes plural heat exchangers 110. In FIG. 2, it is assumed that the heat exchanger unit 100 includes three heat exchangers 110. The heat exchangers 110 adjacent to each other are connected by a connection section 120. For example, the heat exchanger 110 is formed into a cylindrical shape. A pair of partitions 150 is provided in a central portion of the heat exchanger 110. For example, a mesh plate can be used as the partition 150. The inside of the pair of partitions 150 is filled with magnetic particles 130. A gap between the magnetic particles 130 and the outside of the pair of meshes are filled with a liquid refrigerant 140. The side of the heat exchanger 110, which is located on side of the low-temperature-side heat exchanger 40 of the magnetic particles 130 and connected to the low-temperature-side heat exchanger 40, is referred to as a low-temperature end 110T. The side of the heat exchanger 110, which is located on side of the high-temperature-side heat exchanger 50 of the magnetic particles 130 and connected to the high-temperature-side heat exchanger 50, is referred to as a high-temperature end 110K. The low-temperature end 110T and the high-temperature end 110K of the two heat exchangers 110 adjacent to each other are connected by the connection section 120. Openings OP are provided at the low-temperature end 110T and the high-temperature end 110K of the heat exchanger 110.

The switching section 30 is connected to the openings OP of the low-temperature end 110T and high-temperature end 110K of each heat exchanger 110 by a pipe or the like. A liquid refrigerant 140 moves in the heat exchanger 110 by the pump 20 connected to the switching section 30.

In FIG. 2, a flow of the liquid refrigerant 140 illustrated by a bold arrow. In each heat exchanger 110, the liquid refrigerant 140 moves independently from the side of the low-temperature end 110T to the side of the high-temperature end 110K or from the side of the high-temperature end 110K to the side of the low-temperature end 110T.

Different types of the magnetic particles 130 are provided in the three heat exchangers 110, respectively. An exothermic and an endothermic temperature range (operating temperature range) depends on the type of the magnetic particle 130. Accordingly, the magnetic particles 130 having the low operating temperature are provided in the heat exchanger 110 located closer to the low-temperature-side heat exchanger 40 and the magnetic particles 130 having the high operating temperature are provided in the heat exchanger 110 located closer to the high-temperature-side heat exchanger 50.

That is, because the temperatures at the high-temperature end 110K and low-temperature end 110T of the heat exchanger 110 depend on the material configuration for the magnetic particle 130, the material for the magnetic particle 130 can be selected such that the temperatures at the high-temperature end 110K and low-temperature end 110T of the heat exchangers 110 connected by the connection section 120 come close to each other.

When the permanent magnets 10 are disposed to overlap the heat exchangers 110, a magnetic field is applied to the magnetic particles 130 in the heat exchangers 110. Therefore, the magnetic particles 130 having the magnetocaloric effects generate the heat. At this point, the refrigerant pump 20 and the switching section 30 move the liquid refrigerant 140 in the heat exchanger 110 onto the side of the high-temperature end 110K of the heat exchanger 110 to transport the heat onto the side of the high-temperature end 110K.

Then the permanent magnets 10 move away from the magnetic particles 130 to remove the magnetic field from the magnetic particles 130 in the heat exchanger 110. At this point, the magnetic particles 130 absorb the heat. At this point, the refrigerant pump 20 and the switching section 30 move the liquid refrigerant 140 in the heat exchanger 110 onto the side of the low-temperature end 110T to transport the heat onto the side of the low-temperature end 110T. The repetition of this operation generates a temperature gradient in the heat exchanger 110. The generated high heat is transferred to a radiation section through the connection section inserted in the high-temperature end, thereby releasing the heat. The cold heat is transported through the connection section inserted in the low-temperature end, and a cooling section is cooled. That is, the cold heat is obtained from the low-temperature-side heat exchanger 40, and the high heat is obtained from the high-temperature-side heat exchanger 50.

For example, a resin can be cited as the material for the vessel of the heat exchanger 110. For example, Gd (gadolinium) and GdR (R is an rare-earth element, that is, Sc, La, Ce, Pr, Nd, Sm, Eu, Tb, Dy, Ho, Er, Tm, Yb and Lu) can be used as the magnetic particle 130. Additionally, for example, a compound containing each type of the rare-earth element and a transition element, a $LaFe_{13}$-system compound, $LaFe_{13}H$ and MnAsSb can be used as the magnetic particle 130. For example, water, an antifreezing solution, an ethanol solution and a mixture thereof can be cited as the liquid refrigerant 140.

The heat exchangers 110 are connected in series by the connection sections 120 including the solid-core member, the porous body or the combined substance of the solid-core member and the porous body.

The end portion of the connection section 120 invades to the inside of the heat exchanger 110 to come into contact with the liquid refrigerant 140. A metal may be used as the material that transfers heat for the connection section 120. Copper is preferably used from the viewpoint of thermal conductivity. In addition to the copper, a copper alloy whose main component is copper, oxygen-free copper and tough pitch copper can be used as the material for the connection section 120. The oxygen-free copper and the tough pitch copper are hardly affected by the magnetic field, and the oxygen-free copper and the tough pitch copper are also excellent in a corrosion-resistant property and a molding property. Aluminum and an aluminum alloy can also be used as the material for the connection section 120 because the aluminum and the aluminum alloy are excellent in the corrosion-resistant property and the molding property while weight reduction can be achieved. When the solid-core member, the porous body or the combined substance of the solid-core member and the porous body made of metal is coated with the heat-insulating layer, the thermal energy can be prevented from diffusing to the surroundings of the connection section 120. For example, a heat-insulating material such as urethane and polystyrene can be cited as the material for the heat-insulating layer. The heat-insulating layer is provided in the connection section except the portion that is in contact with the liquid refrigerant. That is, in the connection section, the portion located on the outside of the heat exchanger is coated with the heat-insulating layer. The metal may include one rod-shaped member, or plural fibrous metals may be used while bundled.

The end portion of the connection section 120 invades in the inside of the heat exchanger 110, so that the thermal energy can efficiently be transmitted between the low-temperature end 110T and the high-temperature end 110K, which are connected by the connection section 120.

Figure 3A:
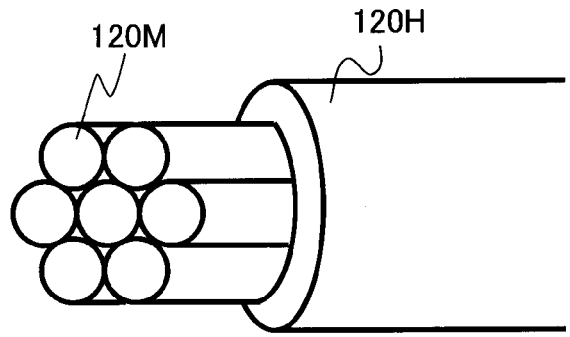
FIG. 3A, FIG. 3B, and FIG. 3C are enlarged views of a connection section of the first embodiment.
Figure 3B:
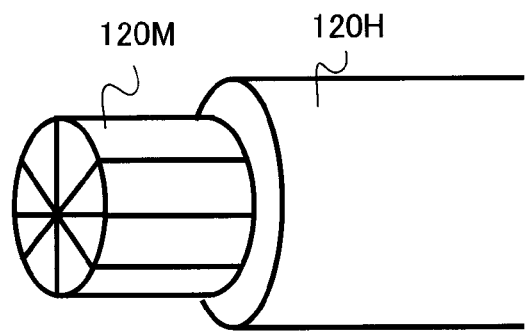
Figure 3C:
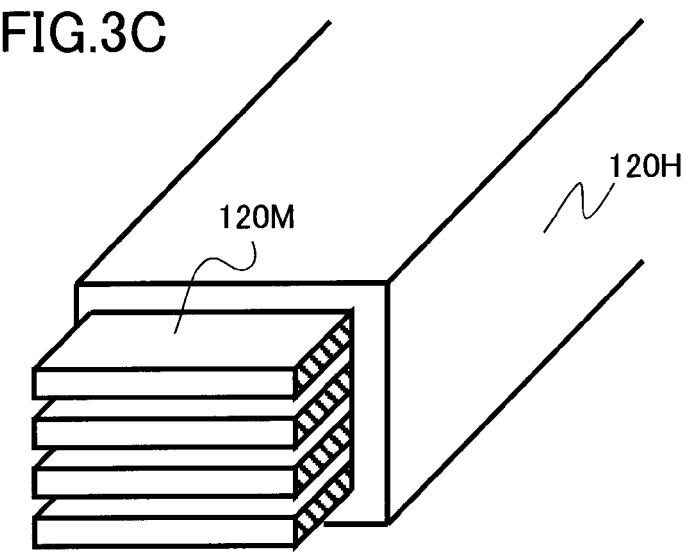

FIGS. 3A, 3B, and 3C are sectional perspective views illustrating an example of an end portion of the connection section 120. As described above, the generation of the high heat or cold heat is associated with the application and removal of the magnetic field. An eddy current caused by the varying magnetic field generates Joule heat to lower the efficiency of the heat transmission of the connection section, and therefore the efficiency of the whole magnetic refrigeration unit is lowered. Therefore, it is necessary that the connection section have a structure in which the eddy current is prevented while the heat is transferred. A sectional area in a direction perpendicular to the magnetic field is reduced in order to prevent the eddy current. For example, FIG. 3A illustrates the connection section 120 that is formed by bundling fibrous metals 120M having circular sections. The metal bundle 120M except the end portion is coated with a heat-insulating layer 120H. The generation of the eddy current can further be suppressed in the connection section 120 with increasing number of fibrous metals 120M. FIG. 3B illustrates the connection section 120 that is formed by bundling plural fibrous metals. The fibrous metals are electrically insulated from one another by an insulating material such as AlN having the insulating property and the high thermal conductivity. The connection section except the end portion is also coated with the heat-insulating layer 120H. FIG. 3C illustrates the connection section in which the electrically-insulated fibrous metals 120M whose sections are formed into rectangular shapes are stacked and coated with the heat-insulating layer 120H.

FIG. 4 is a view illustrating a temperature gradient in a linear direction along when the heat exchangers 110 are linearly arrayed. The heat exchangers 110 are connected in series. A vertical axis indicates a temperature and a horizontal axis indicates a position of the heat exchanger. The high temperature or low temperature generated in the heat exchanger 110 located at one end of the connection section 120 is transferred as the high temperature or low temperature of the heat exchanger 110 located at the other end of the connection section 120. In the three connected heat exchangers 110, the temperature rises from the side of the low-temperature end 110T of the heat exchanger 110 located closest to the low-temperature-side heat exchanger 40 toward the high-temperature end 110K of the heat exchanger 110 located closest to the high-temperature-side heat exchanger 50.

The solid-core member, the porous body or the combined substance of the solid-core member and the porous body is used as the connection section 120, which allows a loss of the thermal energy to be prevented at the connection sections 120. Because a positional relationship between the heat exchangers 110 can freely be designed, the heat exchanger 110 can be disposed according to a design of an apparatus in which the thermal cycling unit is provided.

When the heat exchanger unit includes one large heat exchanger 110, a pressure loss is generated by a portion of the magnetic particles 130 in the heat exchanger, and the liquid refrigerant 140 is hardly moved.

On the other hand, when the temperature gradient is generated while shared by the plural heat exchangers 110, because the pressure loss decreases in each heat exchanger, the liquid refrigerant 140 is easy to move.

When the liquid refrigerant is caused to flow between the heat exchangers to transmit the thermal energy using a tube-shaped member instead of the connection section 120, the pressure loss increases in the heat exchanger with increasing total lengths of the heat exchanger and the tube-shaped member, and the flow of the liquid refrigerant is hardly controlled. When the heat exchanger is disposed according to the shape of the apparatus such as a refrigerator, a freezer and an air conditioner, sometimes the tube-shaped member is formed into an L-shape or a curved shape. When the refrigerant moves in the tube-shaped member having the L-shape or the curved shape, the pressure loss further increases. When the flow of the liquid refrigerant is interrupted, accumulation of the heat is occurred and therefore the efficiency of the system is lowered.

However, when the solid-core member, for example, is used as the connection section 120, the thermal energy can efficiently be transmitted even if the connection section 120 has the complicated shape. When the porous body or the combined substance of the solid-core member and the porous body is used for example, as the connection section 120 instead of the solid-core member, the thermal energy can also efficiently be transmitted.

Thus, the thermal energy can efficiently be transferred between the heat exchangers 110 by the use of the metallic connection section 120. In particular, when the connection section 120 is made of metal, the heat exchangers 110 can freely be disposed. Accordingly, the apparatus provided with the thermal cycling system can be miniaturized.

The connection section 120 is aimed only at the thermal connection between the heat exchangers 110, and the connection section 120 does not generate the thermal energy. Therefore, in the connection section 120 that is longer than the length between the end portions 110T and 110K of the heat exchanger 110, that is, the distance between the two openings OP of the heat exchanger 110, not only the outward radiation of the thermal energy generated by the heat exchanger 110 is promoted, but also the loss of the thermal energy is occurred due to specific heat of the connection section 120. It is also considered that the heat invades from the outside of the connection section 120, for example, external air that is in contact with the connection section 120. Accordingly, preferably the length of the connection section 120 is equal to or shorter than the distance between the two openings OP of the heat exchanger 110. As used herein, the length of the connection section 120 means a length from one end invading in one heat exchanger 110 to the other end invading in the other heat exchanger 110.

On the other hand, when the connection section 120 has an excessively small area that comes into contact with the liquid refrigerant 140 in the heat exchanger 110, the thermal energy is hardly exchanged between the connection section 120 and the liquid refrigerant 140. Therefore, it is necessary that the connection section 120 have a certain level of thickness with respect to the length. Desirably, the connection section 120 has a ratio (or aspect ratio) of a maximum sectional diameter of the end portions (110T and 110K) that comes into contact with the liquid refrigerant 140 perpendicular to a length direction to a length ranging from about 1:4 to about 1:10.

As used herein, the maximum sectional diameter of the connection section 120 does not include the thickness of the heat-insulating layer 120H because the heat-insulating layer 120H is not provided in the end portions 110T and 110K of the connection section 120. That is, as illustrated in FIGS. 3A and 3B, when the metallic portion has the circular section, the diameter of the circle is set to the thickness of the connection section 120. However, the insulating material portion is not included in the diameter. When the connection section 120 is formed by stacking the metallic fibers having the rectangular sections as illustrated in FIG. 3C, longer one of the one side length of the rectangle in a direction perpendicular to the stacking direction of the section and the sum of the lengths of the metallic fibers in the stacking direction is set to the thickness (or diameter) of the connection section 120.

In the first embodiment, the thermal cycling unit includes the three heat exchangers 110. Alternatively, the thermal cycling unit may have at least two heat exchangers 110. In the first embodiment, the liquid refrigerant 140 is moved by the refrigerant pump 20. Alternatively, pistons are provided in the end portions 110T and 110K of the heat exchanger 110, and the liquid refrigerant 140 may be moved by the pistons.

A mechanism that changes the relative position between the permanent magnets and the heat exchanger unit may be used instead of the driving device that moves the permanent magnets. For example, a mechanism that moves the heat exchanger unit may be used.

Second Embodiment

Figure 5:
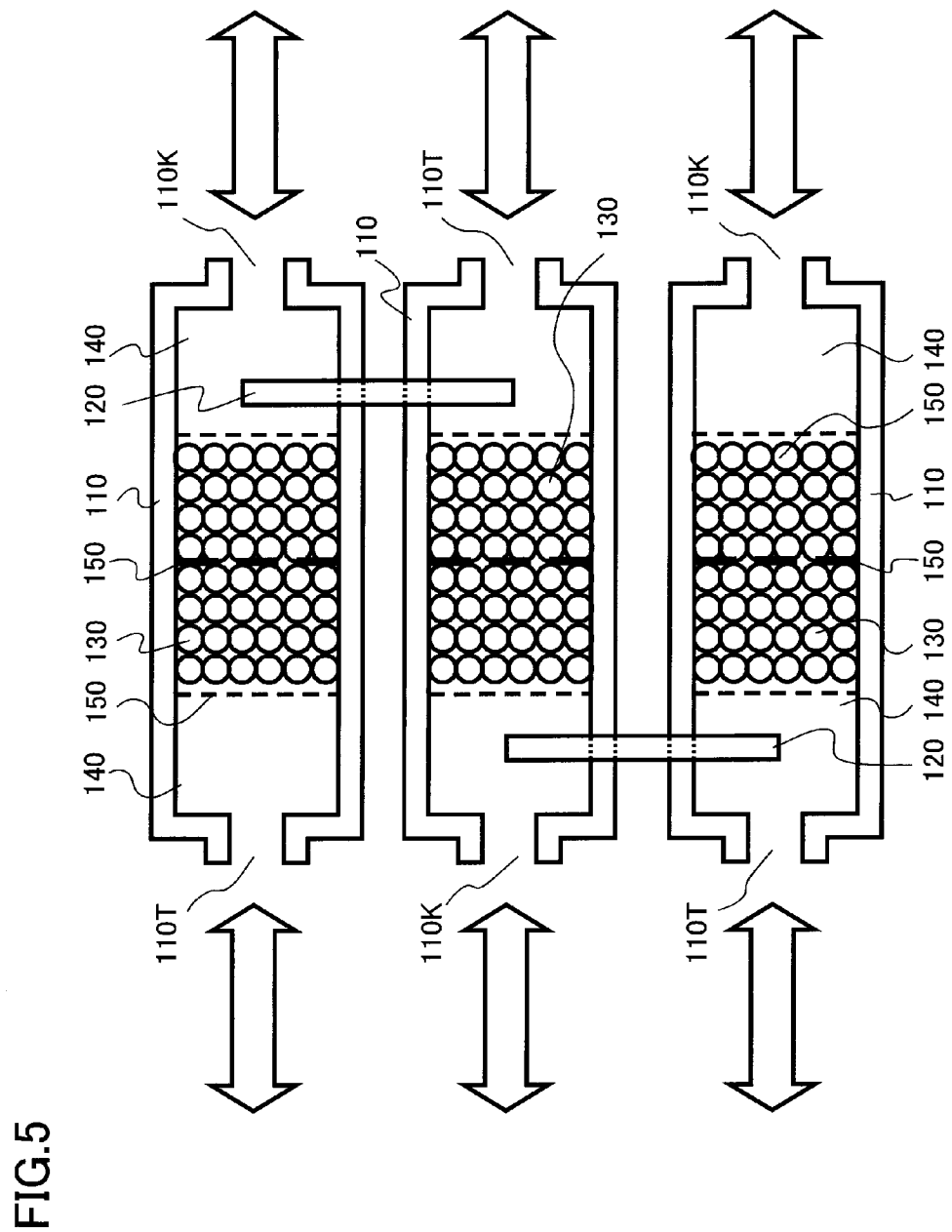
FIG. 5 is a sectional view illustrating a heat exchanger according to a second embodiment.

FIG. 5 is an enlarged sectional view illustrating a heat exchanger 100 according to a second embodiment. The second embodiment differs from the first embodiment in that each two types of the magnetic particles are provided in the heat exchanger 110. A partition 150 is further provided between the pair of partitions 150 of the first embodiment. While the center partition is used as a boundary, the two types of the magnetic particles 130 are provided on the low-temperature end side and the high-temperature end side, respectively.

Because other configurations are similar to those of the first embodiment, the detailed description of the same constituent is omitted.

When the two types of the magnetic particles are used, the temperature gradient generated in the heat exchanger 110 can be adjusted. For example, the magnetic particles 130 having the low operating temperature are provided on the side of the low-temperature end 110T while the magnetic particles having the high operating temperature are provided on the side of the high-temperature end 110K. Compared with the case in which the one type of the magnetic particle 130 is provided, the temperature gradient generated in the one heat exchanger 110 can be widened in the case in which the two types of the magnetic particles 130 are provided.

Desirably the operating temperature at the high-temperature end 110K of one heat exchanger 110 connected by the connection section 120 is close to the operating temperature of the low-temperature end 110T of the other heat exchanger 110 connected by the connection section 120, so that the end portions 110T and 110K of the temperatures at the two heat exchangers can be adjusted by providing the two types of the magnetic particles 130.

Thus, in the second embodiment, the effect similar to that of the first embodiment can be obtained.

Third Embodiment

Figure 6:
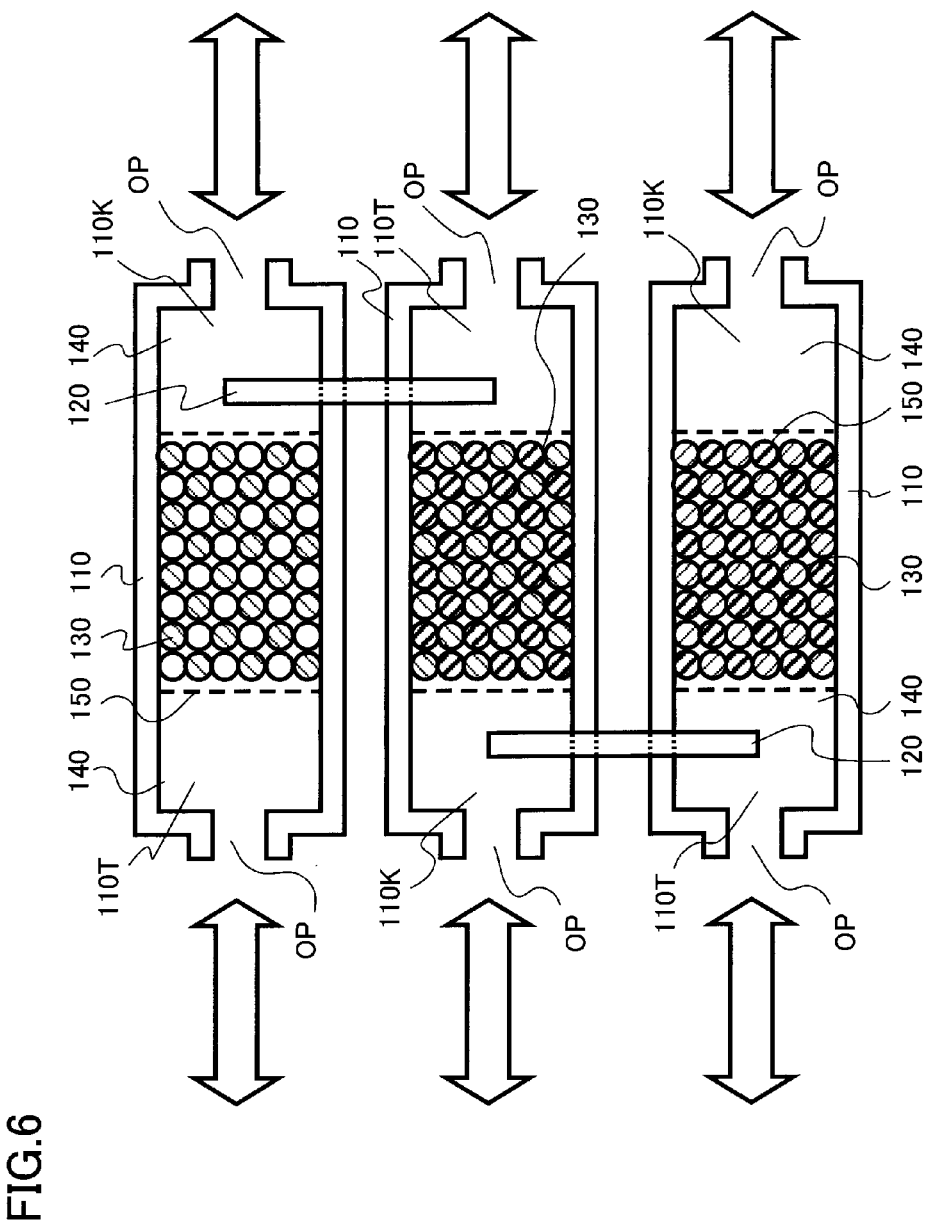
FIG. 6 is a sectional view illustrating a heat exchanger according to a third embodiment.

FIG. 6 is an enlarged sectional view illustrating a heat exchanger 100 according to a third embodiment. The third embodiment differs from the first embodiment in that two types of the magnetic particles 130 are provided in each of the heat exchangers 110 while mixed with each other. The two types of the mixed magnetic particles 130 are provided between the pair of mesh plates.

Because other configurations are similar to those of the first embodiment, the detailed description of the same constituent is omitted.

When the two types of the magnetic particles 130 are provided while mixed with each other, the temperature gradient generated in the one heat exchanger 110 can be adjusted similarly to the second embodiment. The temperature gradient can finely be controlled by adjusting a mixture ratio of the two types of the magnetic particles 130. Thus, in the third embodiment, the effect similar to that of the first embodiment can be obtained.

Fourth Embodiment

Figure 7:
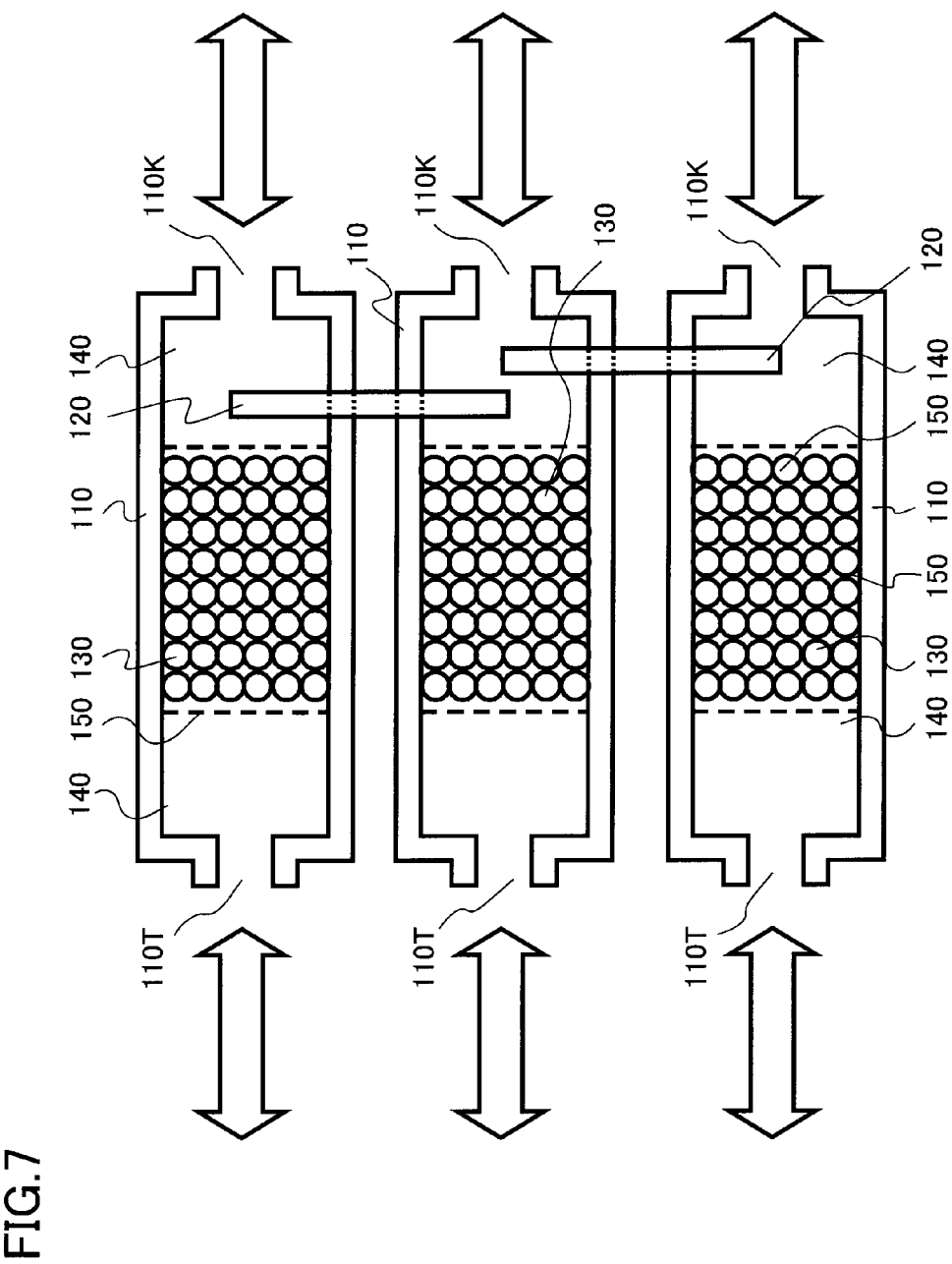
FIG. 7 is a sectional view illustrating a heat exchanger according to a fourth embodiment.

FIG. 7 is an enlarged sectional view illustrating a heat exchanger 100 according to a fourth embodiment. The fourth embodiment differs from the first embodiment in that the heat exchangers 110 are connected in parallel by the connection sections 120. That is, the high-temperature ends 110K of the adjacent heat exchangers 110 are connected by the connection section 120.

When the heat exchangers 110 are connected in parallel, the same type of the magnetic particle can be used in each heat exchanger 110. Because other configurations are similar to those of the first embodiment, the detailed description of the same constituent is omitted.

For example, when the heat exchangers 110 are connected in parallel, a large amount of substance can be cooled or heated such that the thermal cycling unit is used in the refrigerator to cool the large amount of air. Compared with the case in which the large amount of air is cooled by one heat exchanger 110, there is a less risk of interrupting the flow of the liquid refrigerant in the case in which the large amount of air is cooled by the plural heat exchangers 110. Thus, in the fourth embodiment, the effect similar to that of the first embodiment can be obtained.

While certain embodiments have been described, these embodiments have been presented by way of example only, and are not intended to limit the scope of the inventions. Indeed, the heat exchanger unit and the thermal cycling unit described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

Figure 8:
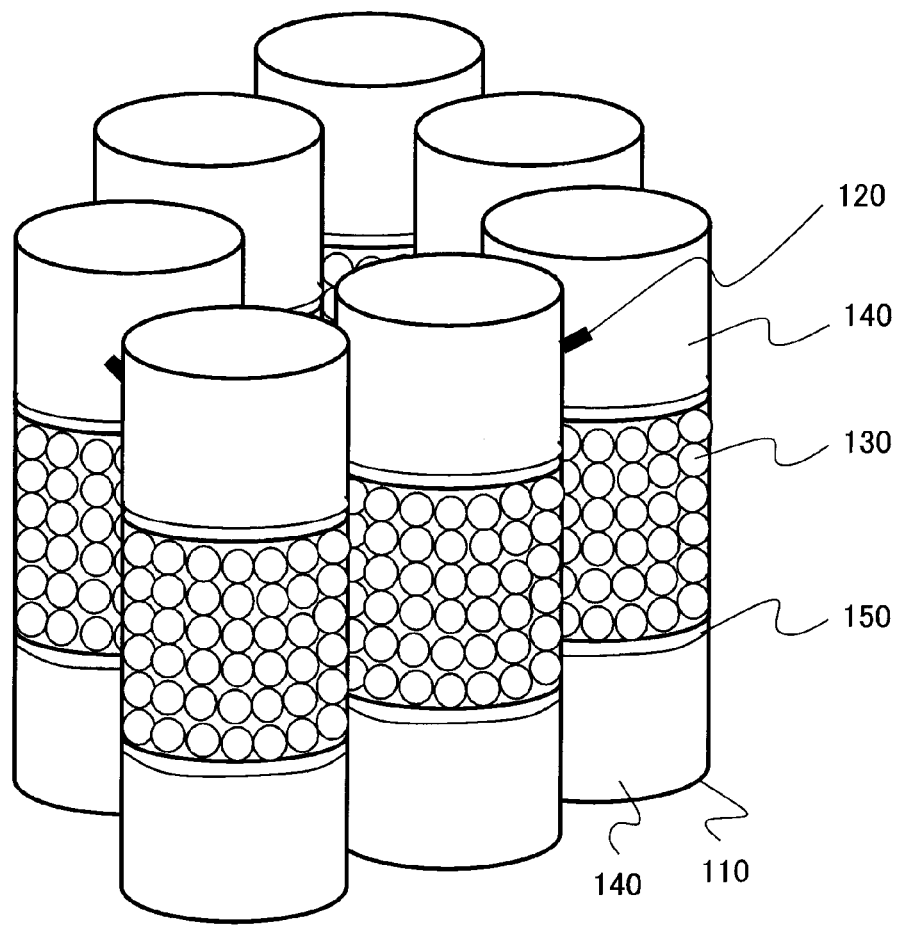
FIG. 8 is a perspective view illustrating another disposition of the heat exchanger.

For example, a configuration in which the plural heat exchangers are connected in series while disposed into a ring shape or a configuration in which the plural heat exchangers are connected in parallel while disposed into the ring shape can be used as illustrated in FIG. 8. When the plural heat exchangers are disposed into the ring shape, a coil is effectively used as the magnetic field applying section.

In the embodiments, the portions that are not directly necessary for the description are omitted in the magnetic material for the magnetic refrigerator, the heat exchanger, the magnetic refrigerator and the like. However, necessary elements relating to the magnetic material for the magnetic refrigerator, the magnetic refrigerator and the like can be selected and used as appropriate.

Examples

Assuming that the one rod-shaped metal coated with the heat-insulating layer was the connection section, the thermal conductivity of the metal, the thermal conductivity of the heat-insulating layer and the temperature at one end of the metal varied to perform simulations for a difference between the temperatures generated at both ends of the connection section. The simulation was performed while the aspect ratio of the metal was set to 1:4, 1:8 and 1:10, respectively.

It was assumed that the temperature at the external air was set to 25° C., and it was assumed that the heat transfer was generated by natural convection between the air and the metal coated with the heat-insulating layer. The thermal conductivity of the heat-insulating layer and the thermal conductivity of the metal were assumed as illustrated in TABLE 1, and the difference between the temperatures generated at both ends of the connection section was obtained when the temperature at one end of the metal was changed. The thickness (or diameter) of the heat-insulating layer was set to ⅕ of the length of the section perpendicular to the direction connecting both ends of the metal. It was assumed that inflow and outflow of the heat except the heat exchange between the heat-insulating layer and the air were eliminated.

TABLE 1

| Aspect ratio | | Thermal conductivity of heat-insulating layer (W/m · K) | Thermal conductivity of metallic portion (W/m · K) | Temp. at one end (° C.) | Difference between temp. at both ends (° C.) |
|---|---|---|---|---|---|
| 1:4 | Example 1 | 0.3 | 400 | 15 | 0.6 |
|  |  |  |  | 10 | 1.0 |
|  |  |  |  | 0 | 1.6 |
|  | Example 2 | 0.03 | 100 | 15 | 0.3 |
|  |  |  |  | 10 | 0.4 |
|  |  |  |  | 0 | 0.7 |
|  | Example 3 | 0.03 | 400 | 15 | 0.1 |
|  |  |  |  | 10 | 0.1 |
|  |  |  |  | 0 | 0.2 |
| 1:8 | Example 4 | 0.03 | 100 | 15 | 1.0 |
|  |  |  |  | 10 | 1.5 |
|  |  |  |  | 0 | 2.5 |
|  | Example 5 | 0.03 | 400 | 15 | 0.3 |
|  |  |  |  | 10 | 0.4 |
|  |  |  |  | 0 | 0.7 |
| 1:10 | Example 6 | 0.03 | 100 | 15 | 1.5 |
|  |  |  |  | 10 | 2.2 |
|  |  |  |  | 0 | 3.6 |
|  | Example 7 | 0.03 | 400 | 15 | 0.4 |
|  |  |  |  | 10 | 0.6 |
|  |  |  |  | 0 | 1.0 |

In Example 1 to Example 3, the aspect ratio of the metal was set to 1:4. In Example 4 and Example 5, the aspect ratio of the metal was set to 1:8. In Example 6 and Example 7, the aspect ratio of the metal was set to 1:10. For each of Example 1 to Example 7, TABLE 1 illustrates the difference between the temperatures generated at both ends when the temperature at one end of the metal was set to 0° C., 10° C. and 15° C. In each of Examples 1 to 7, the difference between the temperatures generated at both ends was equal to or lower than 5° C. irrespective of the temperature at one end of the metal. As described above, desirably the connection section has the small temperature change, and desirably the difference between the temperatures at both ends of the connection section is equal to or lower than 5° C. in view of the temperature gradient generated in the heat exchanger 110.

Accordingly, the thermal energy can efficiently be transmitted between the heat exchangers using the rod-shaped connection section or the connection section in which the fibrous metallic portion is coated with the heat-insulating layer as described in the embodiment.

What is claimed is:

1. A heat exchanger unit comprising:
   a plurality of heat exchangers, each of the heat exchangers includes magnetic particles therein; and
   a connection section provided between the heat exchangers to connect the heat exchangers, the connection section including a solid-core member, a porous body, or a combined substance of the solid-core member and the porous body, the connection section being coated by a heat-insulating layer,
   wherein the connection section invades partially into an inside of the heat exchangers connected thereto.

2. The unit according to claim 1, wherein the solid-core member, the porous body or the combined substance of the solid-core member and the porous body is made of a metal.

3. The unit according to claim 2, wherein the metal is copper or copper alloy whose main component is copper.

4. The unit according to claim 1, wherein each of the heat exchangers includes two openings, the openings are disposed opposite each other, and a length of the connection section is equal to or shorter than a distance between the two openings of one of the heat exchangers connected thereto.

5. The unit according to claim 2, wherein the connection unit has a ratio of a diameter perpendicular to a length direction to a length ranging from 1:4 to 1:10.

6. The unit according to claim 2, wherein the connection section includes a bundle of a plurality of metals.

7. A heat exchanger unit comprising:
   a plurality of heat exchangers, each of the heat exchangers includes magnetic particles and a refrigerant therein; and
   a connection section provided between the heat exchangers to connect the heat exchangers, the connection section including a solid-core member, a porous body, or a combined substance of the solid-core member and the porous body, the connection section being coated by a heat-insulating layer,
   wherein the connection section invades partially into an inside of the heat exchangers connected thereto.

8. The unit according to claim 7, wherein the solid-core member, the porous body or the combined substance of the solid-core member and the porous body is made of a metal.

9. The unit according to claim 8, wherein the metal is made of copper or a copper alloy whose main component is copper.

10. The unit according to claim 7, wherein each of the heat exchangers includes two openings, the openings are disposed opposite each other, and a length of the connection section is equal to or shorter than a distance between the two openings of one of the heat exchangers connected thereto.

11. The unit according to claim 8, wherein the connection unit has a ratio of a diameter perpendicular to a length direction to a length ranging from 1:4 to 1:10.

12. The unit according to claim 8, wherein the connection section includes a bundle of a plurality of metals.

13. A thermal cycling unit comprising:
   a heat exchanger unit having a plurality of heat exchangers, each of the heat exchangers includes magnetic particles therein, and a connection section provided between the heat exchangers to connect the heat exchangers, the connection section includes a solid-core member, a porous body, or a combined substance of the solid-core member and the porous body, the connection section being coated by a heat-insulating layer;
   permanent magnets provided across the heat exchanger unit from each other;
   a mechanism configured to change a relative position of the permanent magnet and the heat exchanger unit;
   a high-temperature-side heat exchanging section being connected to the heat exchanger unit to emit thermal energy of the heat exchanger unit; and
   a low-temperature-side heat exchanging section being connected to the heat exchanger unit to receive cold energy of the heat exchanger unit.

14. The unit according to claim 13, wherein the solid-core member, the porous body or the combined substance of the solid-core member and the porous body is made of a metal.

15. The unit according to claim 14, wherein the metal is made of copper or a copper alloy whose main component is copper.

16. The unit according to claim 13, wherein each of the heat exchangers includes two openings, the openings are disposed opposite each other, and a length of the connection section is equal to or shorter than a distance between the two openings.

17. The unit according to claim 14, wherein the connection unit has a ratio of a diameter perpendicular to a length direction to a length ranging from 1:4 to 1:10.

* * * * *